United States Patent [19]
Castro

[11] Patent Number: 5,247,206
[45] Date of Patent: Sep. 21, 1993

[54] NEURAL NETWORK ACCOMMODATING PARALLEL SYNAPTIC WEIGHT ADJUSTMENTS IN A SINGLE CYCLE

[75] Inventor: Hernan A. Castro, Shingle Springs, Calif.

[73] Assignee: Intel Corporation, Santa Clara, Calif.

[21] Appl. No.: 885,528

[22] Filed: May 19, 1992

Related U.S. Application Data

[63] Continuation-in-part of Ser. No. 851,289, Mar. 12, 1992.

[51] Int. Cl.5 .............................. G06G 7/12
[52] U.S. Cl. ...................... 307/201; 395/23
[58] Field of Search ............. 307/201; 395/23, 24

[56] References Cited
U.S. PATENT DOCUMENTS

| | | | |
|---|---|---|---|
| 4,904,881 | 2/1990 | Castro | 307/201 |
| 4,906,865 | 3/1990 | Holler | 307/201 X |
| 4,950,917 | 8/1990 | Holler et al. | 707/201 |
| 4,956,564 | 9/1990 | Holler et al. | 307/201 |
| 4,961,002 | 10/1990 | Tam et al. | 307/201 |
| 4,999,525 | 3/1991 | Park et al. | 307/201 |
| 5,021,693 | 6/1991 | Shima | 307/201 X |
| 5,028,810 | 7/1991 | Castro et al. | 307/201 |
| 5,040,134 | 8/1991 | Park | 307/201 X |
| 5,053,638 | 10/1991 | Funatani et al. | 307/201 |
| 5,101,361 | 3/1992 | Ebenhardt | 395/24 |
| 5,155,377 | 10/1992 | Castro | 307/201 |

OTHER PUBLICATIONS

Hollis et al., "Artificial Neurons Using Analog Multipliers", Dept. Elect & Computer Eng., N.C. State U, Raleigh, N.C.

Primary Examiner—David R. Hudspeth

[57] ABSTRACT

A neural network providing correlation learning in a synapse cell coupled to a circuit for parallel implementation of weight adjustment provides the learning portion of the synaptic operation and includes a floating gate device having a corresponding floating gate member that stores the connection weight of the cell. Parallel weight adjustments are performed in a single operational cycle utilizing floating gate technology and control signals that facilitate programming/erasing operations.

12 Claims, 8 Drawing Sheets

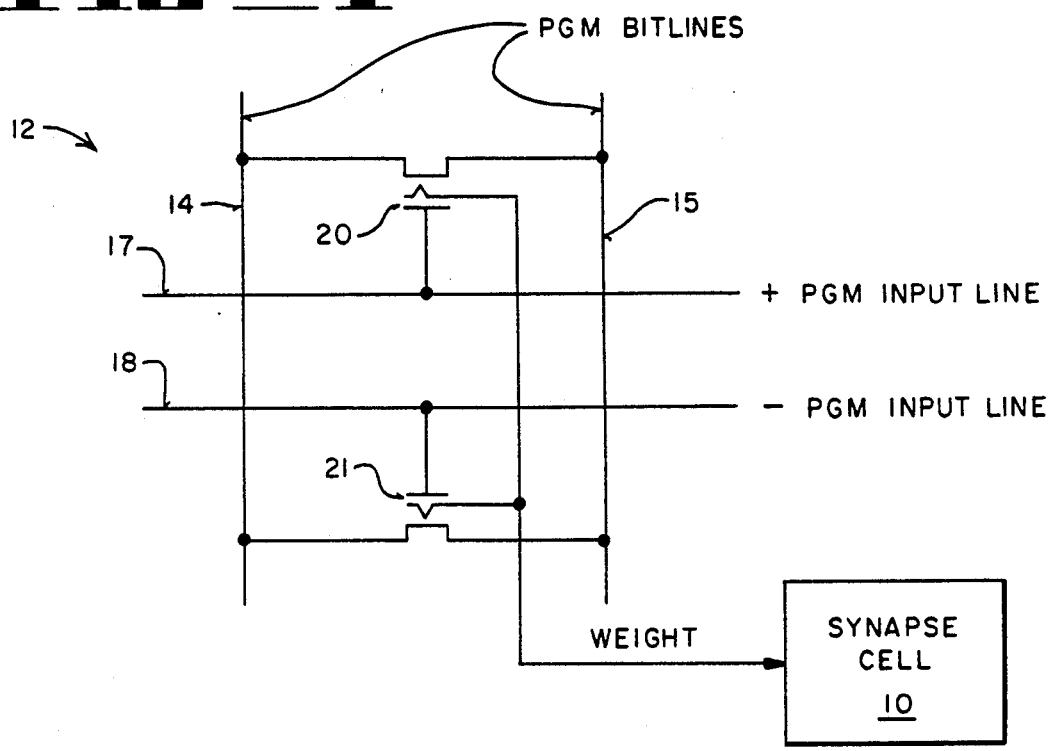
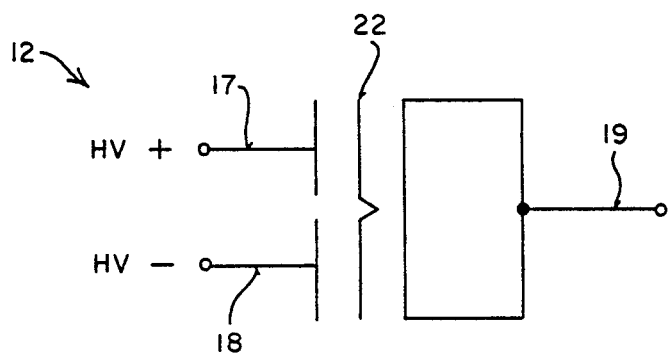

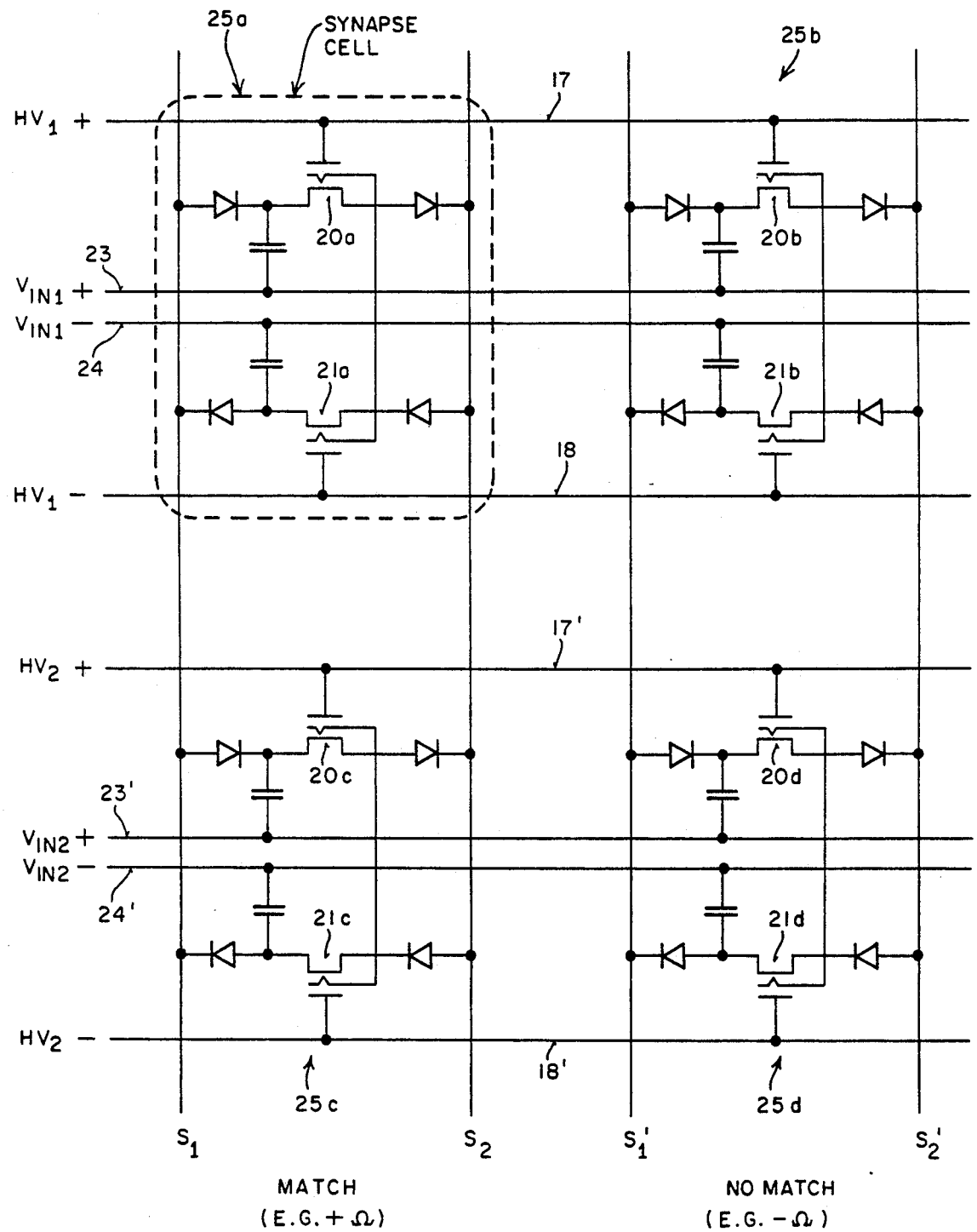

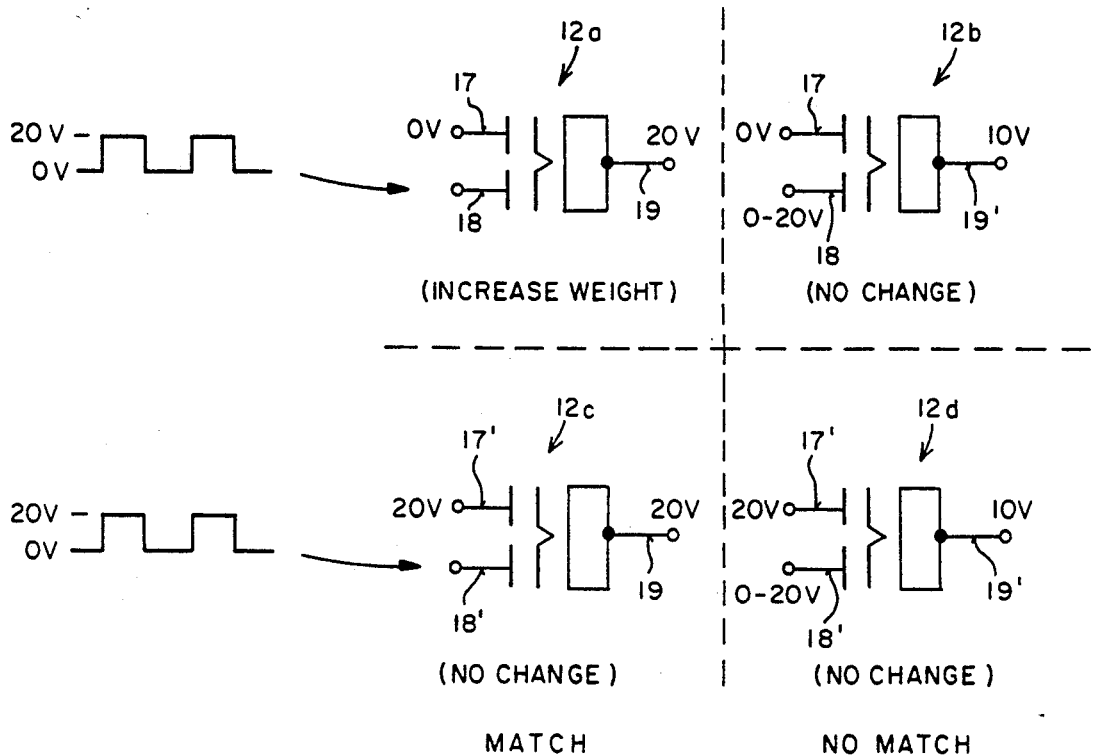
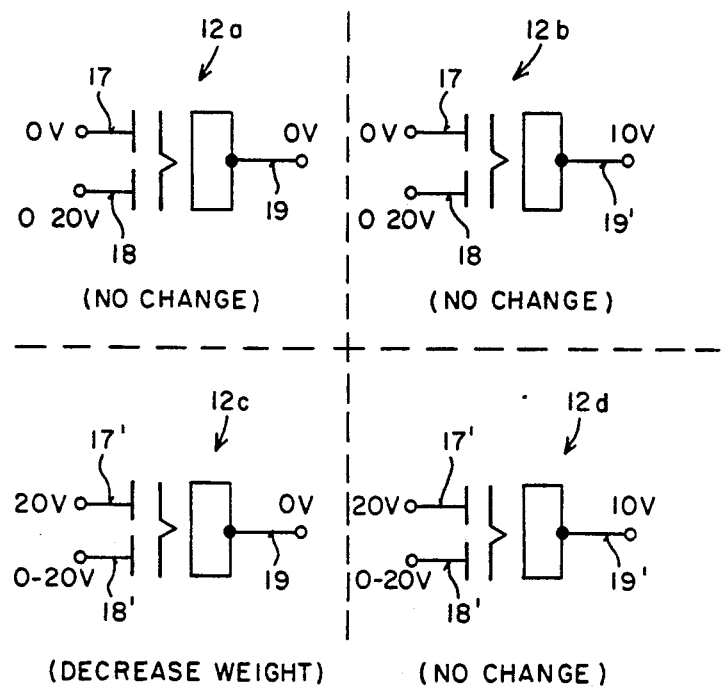

FIG _ 6 CYCLE 3
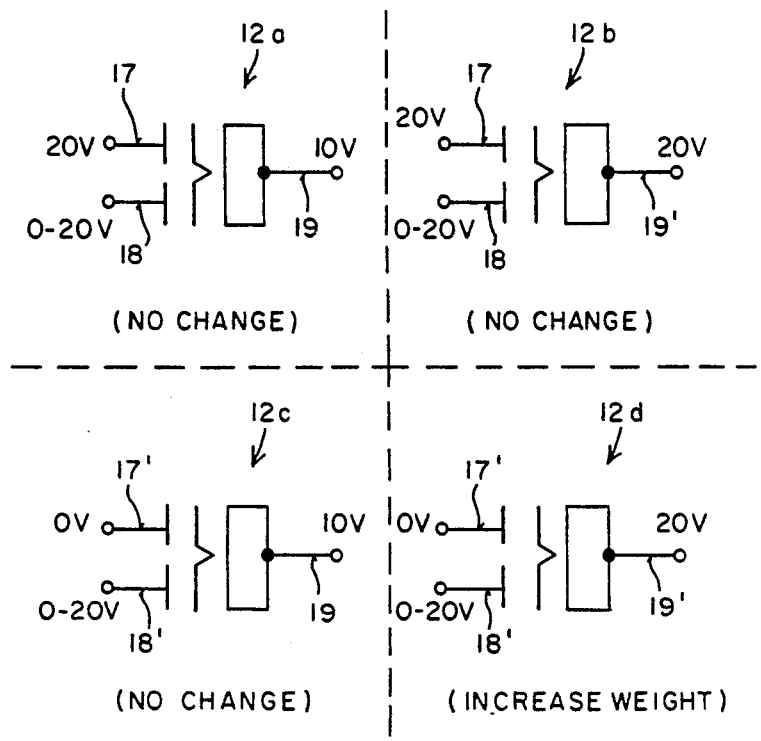
FIG _ 7 CYCLE 4
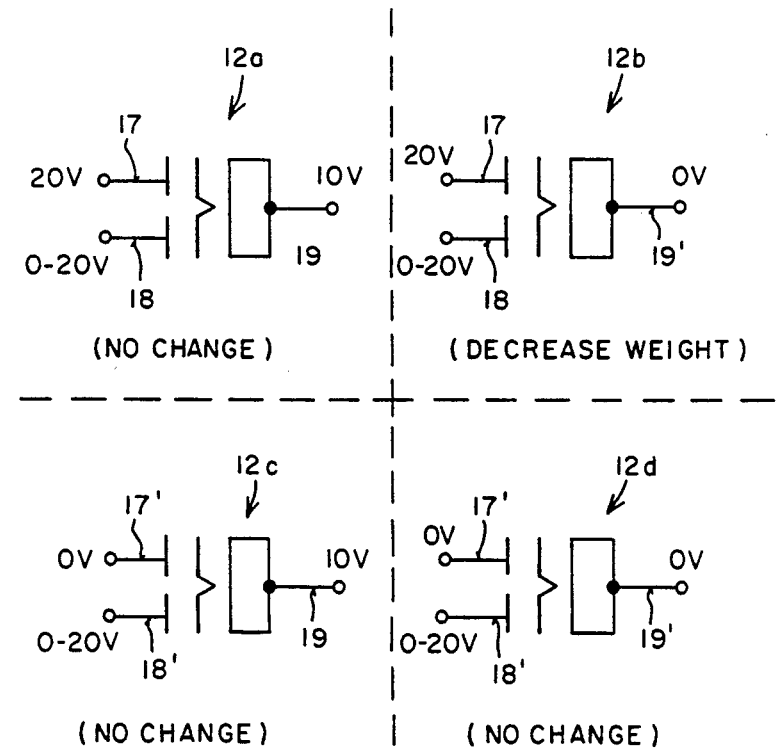

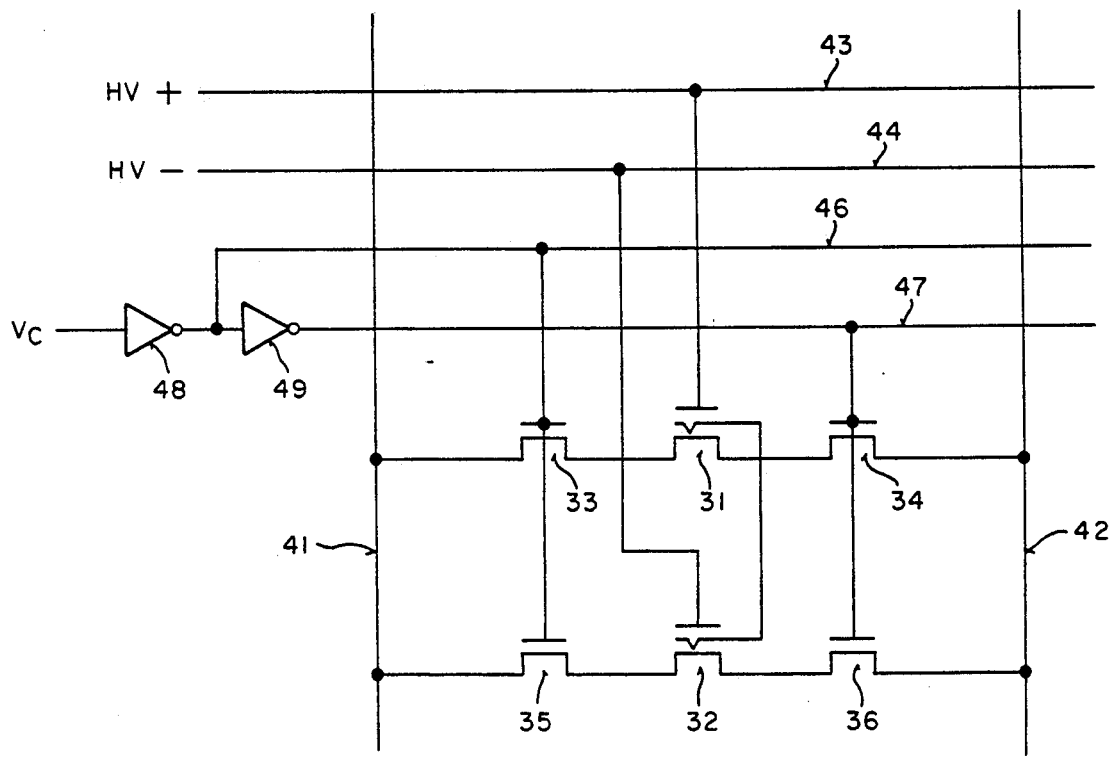

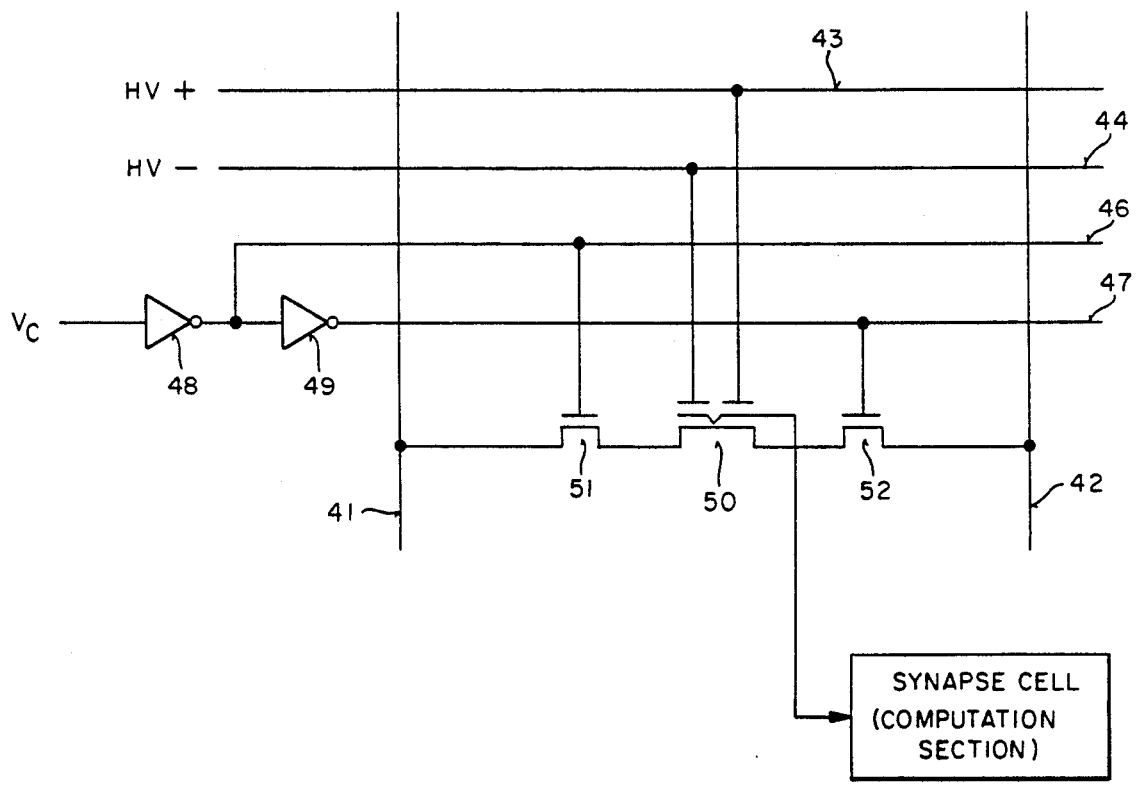
FIG_9

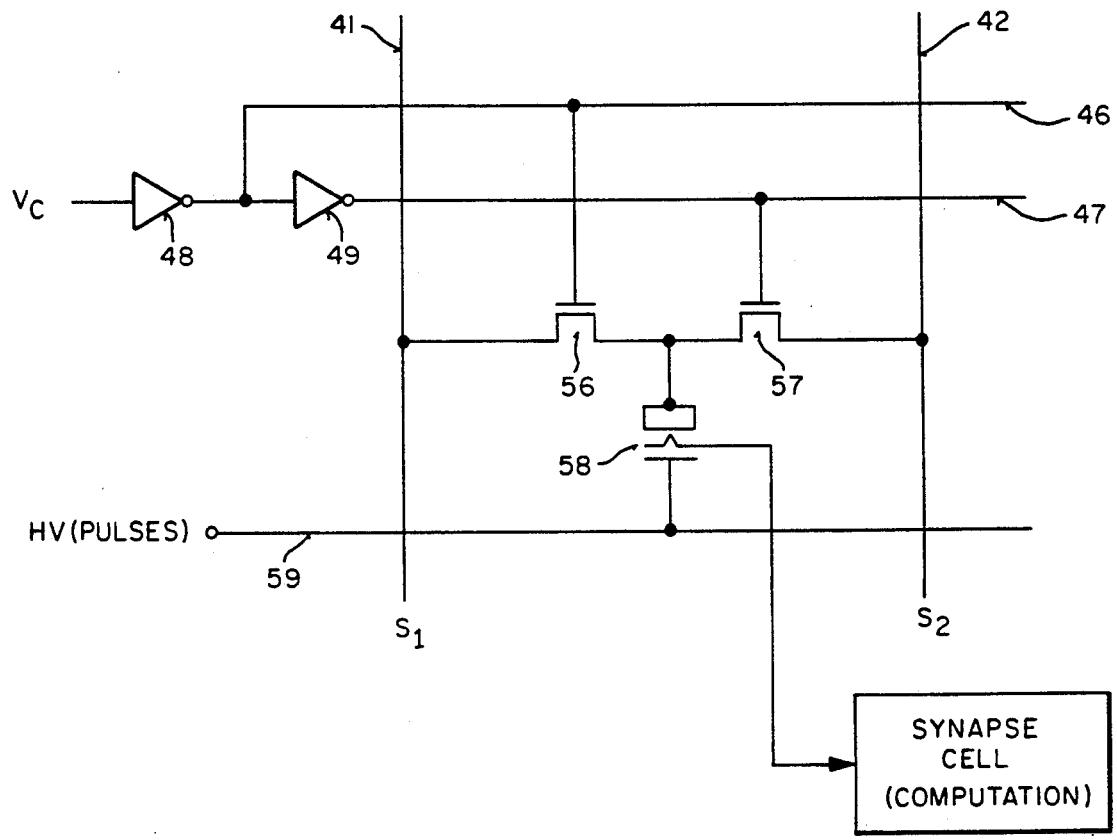
FIG _10

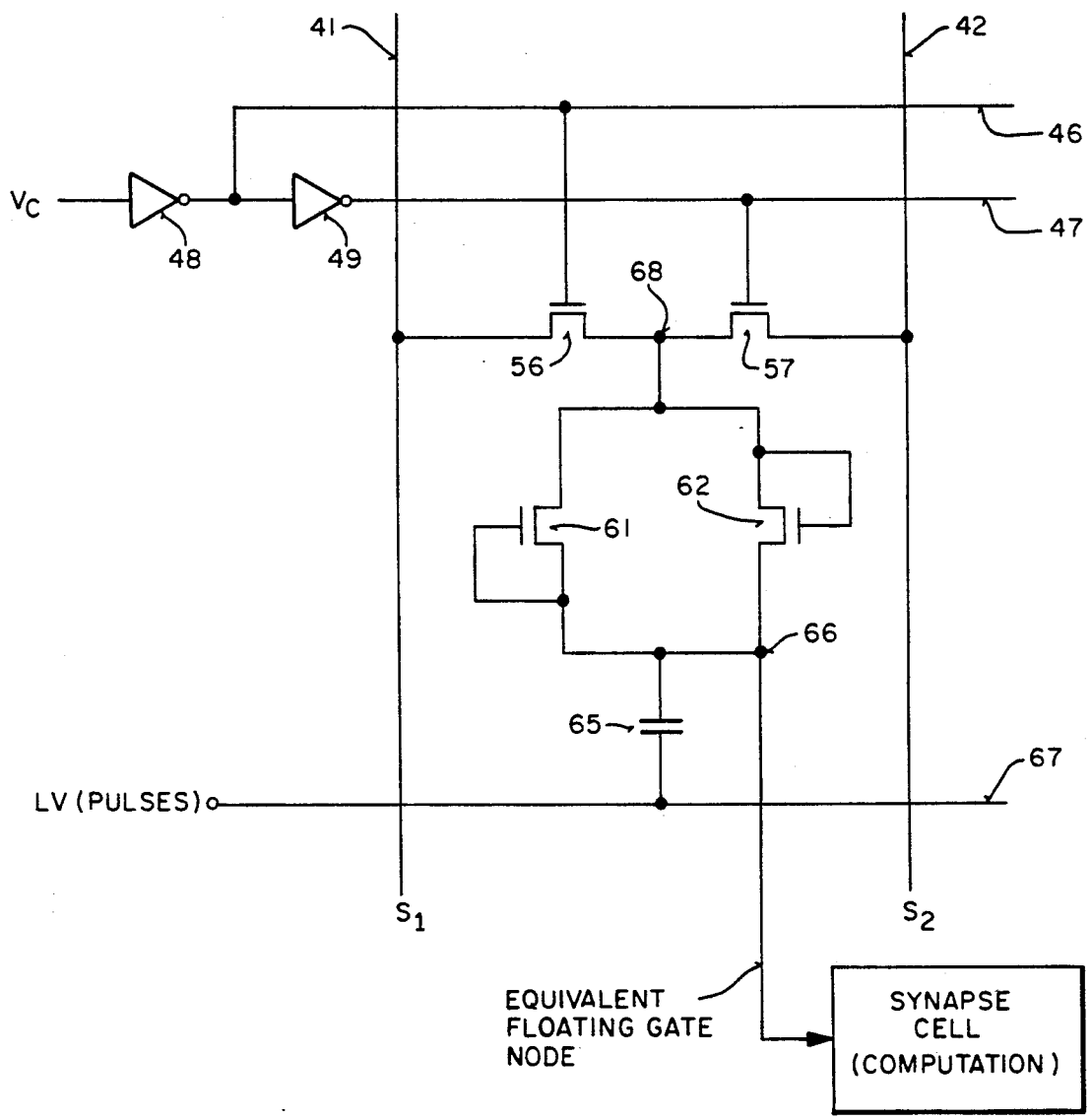
FIG _ 11

NEURAL NETWORK ACCOMMODATING PARALLEL SYNAPTIC WEIGHT ADJUSTMENTS IN A SINGLE CYCLE

RELATED APPLICATIONS

This is a continuation-in-part (CIP) application of Ser. No. 07/851,289; filed Mar. 12, 1992, which is assigned to the assignee of the present invention.

FIELD OF THE INVENTION

The present invention is related to the field of artificial neural networks and more particularly to circuits and methods for implementing different neural learning algorithms.

BACKGROUND OF THE INVENTION

Artificial neural networks are a class of electronic circuits which attempt to achieve human-like performance in the fields of speech and image recognition via dense interconnection of simple computational elements. The neural network structures and electronic circuits comprise the computational elements in the network and are each based on our present understanding of biological nervous systems. The promise of neural networks lies in their ability to provide parallel processing of information at high computational rates, far exceeding the performance of conventional von Neumann computers which perform a program of instructions sequentially.

Neural networks generally take the form of a matrix comprised of a set of horizontal lines which cross and are coupled to a set of vertical lines. The horizontal lines simulate the functions of axons in the cortex of the brain and provide the inputs to the network. The vertical lines simulate the function of dendrites. The vertical dendrite lines are terminated at summing devices which replicate the function of the soma, otherwise known as the neuron cell body. Examples of such networks can be found in U.S. Pat. Nos. 4,950,917, 4,906,865 and 4,904,881.

Within the neural network, electronic circuits are employed to model the function of a biological synapse. Collectively, these circuits provide resistive interconnections between the horizontal and vertical lines of the network. Individual synapse cells provide a weighted electrical connection between an input and summing element (i.e., a neuron body). The relative strength of the connection often changes during the training or learning process. The strength of the interconnection is often referred to as the weight of the memory.

Electronic synapse cells have been developed for storing connection weights in the form of electrical charge. Among the various approaches to building electrical synapse circuits which have been explored, the most promising designs employ floating gate devices. In a floating gate device current flow is modulated depending on the value of a stored electrical charge. Examples of semiconductor synapse cells which employ floating gate devices for storing weights are found in U.S. Pat. Nos. 4,956,564 and 4,961,002.

One of the most intriguing aspects of neural network circuits is their learning capability. During the learning process, the network is presented with a set of training data inputs. For each set of inputs an output of the network is calculated and compared with a desired output. The weights of the synaptic connections are then adjusted according to a weight-adjustment algorithm. A wide variety of learning algorithms have been developed—the most common of these being those which employ a "local rule" or "outer product" weight update rule where the change (or sign) in the weight for a particular synapse is proportional to the sign of the input and some output-related quantity. The output-related quantity is associated with the neuron to which it is connected and is referred to in this application as the quantity $\Omega$. The interpretation of the quantity $\Omega$ depends on the particular learning algorithm employed. The local rule class of algorithms includes, for example, Hebbian, Boltzman, Mean Field, Delta Rule and Back-Propagation algorithms, among others.

One drawback with neural circuits to date has been their inability to include learning capabilities directly on chip. In other words, modern neural network circuits do not integrate the learning procedure on the same silicon chip as the network itself. In these circuits the weights are usually determined by simulation on a host computer, after which time they are down-loaded to the network. At least part of the reluctance to provide neural network implementations which allow learning to occur directly on chip has been the relative complexity of the algorithms involved, as well as the cautious approach of not committing to one particular type of algorithm. For instance, future research may reveal that certain present-day algorithms provide non-optimal learning.

As will be seen, the present invention discloses several learning circuits and a number of methods for analog, parallel implementation of a class of learning algorithms. Analog methods provide inherently higher density and computation speed than most digital implementations. Thus, the present invention provides a very dense network capable of high speed operation during the learning mode. Furthermore, by incorporating the learning on the chip itself, the weight adjustment process is enhanced by the parallelism inherent in the neural network architecture. Hence, the network of the present invention is truly adaptive in that weights can be adjusted in real-time.

SUMMARY OF THE INVENTION

The present invention covers a neural network providing correlation learning in a synapse cell. In the network of the present invention a plurality of synapse cells are either coupled to or incorporate a corresponding plurality of semiconductor circuits for parallel implementation of weight adjustments in a broad class of learning algorithms. The circuits are each coupled to an associated synapse cell. The semiconductor circuits provide the programming or learning portion of the synaptic operation, while the remainder of the synapse cell provides the computational element. In various embodiments, both portions are integral to the cell itself.

In one embodiment, the neural network including an array of cells for computing the product of an input signal and a connection weight to generate a neural output signal. Each of the cells comprises an associated circuit for implementing weight updates in a single learning cycle wherein the circuit comprises a charge storage means for storing an electrical charge representing the connection weight. A logic means is also included for coupling the neural output signal back to the charge storage means. The network further comprises a means for generating a voltage pulse stream coupled to the charge storage means. The voltage pulse stream has a magnitude capable of producing an electric field sufficient to effectuate charge transfer to/from the charge storage means.

BRIEF DESCRIPTION OF THE DRAWINGS

FIG. 1 is a schematic diagram of the basic learning circuit of the present invention.

FIG. 2 is an equivalent device representation of the circuit of FIG. 1.

FIG. 3 illustrates the learning circuit of FIG. 1 incorporated into a portion of a neural network array.

FIGS. 4-7 illustrate the method of parallel implementation of a learning algorithm in accordance with the present invention.

FIG. 8 illustrates a schematic diagram of an alternative learning circuit which provides correlation learning in two cycles.

FIG. 9 is a simplified version of the circuit of FIG. 8 that provides correlation learning in two cycles using a minimal number of devices.

FIG. 10 illustrates the learning section of a cell that operates to update synaptic weights in a single cycle.

FIG. 11 also illustrates the learning section of a cell that operates to update synaptic weights in a single cycle, but which does not employ floating gate devices.

DETAILED DESCRIPTION

A silicon implementation of parallel learning for neural networks is described. In the following description, numerous specific details are set forth, such as specific voltages, conductivity types, configurations etc., in order to provide a thorough understanding of the present invention. It will be obvious, however, to one skilled in the art that these specific details are not essential to practicing the present invention. In other instances, well-known structures and circuits have not been shown or explained in detail in order to avoid unnecessarily obscuring the present invention.

NEURAL WEIGHT UPDATES IN FOUR CYCLES

Referring to FIG. 1 there is shown a schematic diagram of a semiconductor learning circuit 12 comprising floating gate devices 20 and 21. Both floating gate devices are shown coupled between programming bit lines 14 and 15. The control gate of device 20 is coupled to positive programming input line 17, and the control gate of device 21 is coupled to negative programming input line 18. Both devices 20 and 21 have their floating gate members coupled together (i.e., in common). All of the components illustrated in FIG. 1 may be fabricated using a conventional metal-oxide-semiconductor (MOS) process flow.

The electrical charge programmed onto the common floating gate represents the synaptic weight. This weight is shown in FIG. 1 being coupled to the computational portion of an individual synapse cell 10. As will be discussed in more detail shortly, semiconductor circuit 12 performs the learning function in a neural network by adaptively changing the interconnection strengths between the neurons. This interconnection strength is represented by the synaptic weight which is changed in circuit 12 by programming and erasing of floating gate devices 20 and 21.

Floating gate devices 20 and 21 are typically programmed via charge injection through a thin (on the order of 100 angstroms) oxide fabricated between the gate and either the drain or separate diffusion terminal. Relatively high voltages (e.g., 10–20 volts) are required to effect programming onto the floating gate. These same high voltages are also needed during erasing, which typically occurs via Fowler-Nordheim tunneling of charge from the floating gate to the substrate. Under normal conditions, the conductance through devices 20 and 21 is linearly proportional to the amount of charge stored on the common floating gate member. This charge is retained indefinitely (e.g., many years) because the floating gate member is usually encapsulated by an insulative dielectric layer.

Although FIG. 1 illustrates learning circuit 12 as a distinct element, separate from the computational portion of a synapse cell 10, it is appreciated that for many applications, circuit 12 is incorporated within each synapse cell of the neural network. In other words, the programming/learning and computational portions of the synaptic function are preferably integrated into a single cell which includes the basic elements depicted in FIG. 1.

By way of example, a class of electronic synapse circuits which operate by transferring charge from one summing line to another in a neural network is described in a copending patent application entitled "Charge Domain Differential Conductance Synapse Cell for Neural Networks", Ser. No. 07/821,634, filed Jan. 16, 1992, which application is assigned to the assignee of the present invention. Each of the synapse cells in the above-referenced application are easily adapted to incorporate the learning circuit and methods of the present invention.

FIG. 2 illustrates an equivalent schematic diagram of the learning circuit 12 of FIG. 1. Note that circuit 12 in FIG. 2 is depicted in a simplified form as a single field-effect device having dual control gates 17 and 18, and a floating gate member 22. Programming bit lines 14 and 15 from FIG. 1 are shown merged to a single source/drain line 19. The reason for this is that during programming and erasing both the source and drain lines of the floating gate devices are commonly coupled to the same potential. In the circuits of FIGS. 1 and 2, the relatively high voltages required for programming are coupled to the respective control gates along positive and negative programming input lines 17 and 18.

It is appreciated that it is not necessary to maintain distinct source and drain lines as shown in FIG. 1, except as is convenient from the layout of the computation sections of the cell or for testing purposes. In fact, the simplified schematic of FIG. 2 can be fabricated as a single MOS floating gate device having dual control gates, wherein the floating gate member can be routed to the computation portion of the synapse cell.

During the learning phase of its operation, the network is typically presented with a set of training examples. For each example the network's output is compared with a desired output. After comparison, the interconnection strengths of the network are adjusted according to a proper learning algorithm. In the context of the present invention, these adjustments consist of changes to the interconnection weights of each of the synapse cells within the neural network array. This is achieved by programming/erasing floating gate member 22.

By way of example, device 12 of FIG. 2 may be programmed with charge by grounding line 19 and raising lines 17 and 18 to a high positive potential (e.g., 20 volts). Under these conditions, charge accumulates on floating gate member 22, the magnitude of the accumulation being proportional to the duration that the high voltages are applied and their amplitude. It is important to recognize that the capacitances associated with the circuit of FIG. 2 are such that if one or both of input lines 17 and 18 are driven to a relatively low voltage (e.g., ~10 volts or less), then there will be an insufficient electric field to effectuate programming of floating gate device 12.

The same is true during erasing. During erasing, source/drain line 19 is coupled to a relatively high voltage (e.g., 20 volts) and input lines 17 and 18 are taken to a low voltage, preferably ground. This causes electrons present on floating gate 22 to tunnel into the substrate. However, if either line 17 or 18 has its potential raised to a level which approaches the potential on line 19, then erasing will not occur. That is, no change will occur to the programming state of floating gate 22. Under such conditions, device 12 is effectively debiased, meaning that the stored weight on floating gate 22 in unaffected. To repeat, there is no change to the programming state of device 12 whenever one of input line 17 and 18 is low and the other is at a relatively high voltage potential. The presently invented neural network relies upon this fact during the learning phase of its operation, as is explained further below.

Now with reference to FIG. 3, there is shown a portion of a neural network comprising a plurality of synapse cells 25 arranged in rows and columns. As should be apparent, synapse cells 25 multiply the input voltage provided along input lines 23 and 24 by the weight stored within the cell. The result of this calculation is summed with the results of all of the other synapse cells in the same column, i.e., coupled along the same pair of column summing lines $S_1$ and $S_2$. Note that the particular synapse cell illustrated in FIG. 3 is of a type which transfers charge from one summing line to the other in response to pulsed voltage transitions on input lines 23 and 24. The column summing lines within the network are coupled to neural summing devices which determine when a match occurs between an input voltage pattern and a stored weight for that column of the array. The neural summing devices usually comprise an ordinary operational amplifier. By way of example, summing lines $S_1$ and $S_2$ in FIG. 3 indicate a match condition, or $+\Omega$ for that column, whereas summing lines $S_1'$ and $S_2'$ indicate no match, or $-\Omega$.

As can be seen, each of the synapse cells include a pair of floating gate devices 20 and 21 which function as a learning circuit for parallel implementation of a learning algorithm. By way of example, synapse cell 25a incorporates floating gate device 20a and 21a. Each of these floating gate devices is coupled between summing lines $S_1$ and $S_2$. Both share a common floating gate member. Floating gate device 25a has its control gate coupled to programming input wordline 17, while the control gate of floating gate device 21a is coupled to programming input wordline 18. This synaptic structure is repeated throughout the entire neural network array.

The charge coupled synapse cell illustrated in FIG. 3 works by transferring a small quantity of charge across the summing lines with each energy pulse received along either of input lines 23 and 24. The magnitude of the charge packet transferred is, of course, dependent on the programmed voltage threshold of the learning devices 20 and 21. To better understand how parallel learning of a particular input/output match is implemented according to the present invention, consider the following example.

Assume that the match conditions shown in FIG. 3 exist. That is, column lines $S_1$ and $S_2$ indicate a match condition whereas column lines $S_1'$ and $S_2'$ indicate no match. During the learning process, the summing lines of each column are driven to either a very high, a low, or an intermediate voltage potential depending on whether a particular synapse cell is to be programmed, erased or no change is to occur to the weight stored therein. For the situation in FIG. 3, driving the summing lines in a particular column to the same potential means that the diode devices are effectively shorted. This means that the potential on the source and drain regions of devices 20 and 21 is essentially the same.

Continuing with the above example, FIG. 4 illustrates the first learning cycle for the neural network of FIG. 3. For the simplified diagram of FIG. 4, device 12a (corresponding to synapse cell 25a in FIG. 3) is targeted for a weight increase, while the remaining devices 12b-12d are to undergo no change in their programming thresholds. To program device 12a, common lines $S_1$ and $S_2$ (represented by line 19 in FIG. 4) are coupled to relatively high voltage potential, e.g., ~20 volts. Programming input wordline 17 is grounded and programming input wordline 18 receives a high voltage pulse stream which alternately transitions between 0 and 20 volts. Whenever input programming line 18 is low (e.g., 0 volts) erasing occurs. This means that due to the high electric field which exists between the control gate and substrate of device 12a, electrons tunnel from the floating gate into the substrate. With less charge present on the floating gate member, the conductance of device 12a is increased, thereby increasing the connection strength in the network. Note that erasing occurs only as long as programming input line 18 is held at a low potential.

Whenever line 18 transitions to a high voltage potential, device 12a is effectively debiased. In other words, with lines 18 and 19 at a high voltage and line 17 grounded, the electric field experienced by the floating gate is sufficiently weakened that erasing (or programming) can no longer occur. For this condition, no change occurs to the programming threshold of device 12a. In this manner, the electrical charge is metered onto the floating gate by applying high voltage pulses in the form of a programming input. The high voltage pulses present at line 18 have a frequency and amplitude which can be made independent of the neural output (or $\Omega$), and can thus be a global signal for the entire array. The frequency is preferably modulated by the magnitude of the desired input signal, regardless of sign. In this case, line 18 may run parallel to the input lines. The sign of the input signal controls the DC potential at line 17. Line 18 can alternatively run perpendicular to the input lines (e.g., parallel to the summing lines) in which case the frequency is preferably modulated by the magnitude of the neuron output (or $\Omega$), once again independent of sign.

It is important to recognize that during the first learning cycle only one of the four cells shown in the example has its weight altered. The remaining cells are prohibited from changing their voltage threshold during this cycle by means of appropriate control over the column summing and input programming line potentials.

Consider device 12b, which shares the same programming input wordline with device 12a. Device 12b is inhibited from being either programmed or erased by the application of an intermediate voltage potential (e.g., 10 volts) to the summing lines represented by line 19'. Application of an intermediate voltage means that even when programming input line 18 transitions to a low voltage, the electric field strength experienced by the floating gate is insufficient to cause tunneling of electrons to the substrate. Thus, device 12b undergoes no change in its programming state during the first learning cycle.

Now consider what happens to the synaptic devices in the next row in the array during the first cycle. Device 12c in FIG. 4 also receives a pulse stream input to programming input line 18'. Although line 19 is coupled to a high voltage potential, the connection weight of device 12c is not changed during cycle 1 because a similarly high potential (e.g., 20 volts) is coupled to programming input wordline 17'. The result of coupling line 17' to a high voltage means that device 12c is also debiased during this learning cycle. Similarly, device 12d receives no change to its stored weight condition by virtue of the fact that it shares column summing line 19' with device 12b. Recall that line 19' is maintained at an intermediate potential during the first cycle of the parallel learning method.

FIG. 5 illustrates the applied voltages to the array of FIG. 3 during the second cycle of the learning process. Once again, input programming wordlines 18 and 18' receive a high voltage pulse stream which alternately transitions between a low and a high programming potential, e.g., from 0 to 20 volts. Column summing line 19 is coupled to ground, while column summing line 19' is held at an intermediate voltage of approximately 10 volts. Input programming wordline 17 is grounded to debias synapse cells 12a and 12b. Device 12c has its input programming wordline 17' raised to a high positive potential so that whenever input wordline 18' transitions high, the floating gate of device 12c is programmed. This causes a decrease in the weight of the connection associated with that synapse cell.

Notice that during cycle 2, device 12b is also debiased by the application of an intermediate voltage to summing line 19'. As explained earlier, the frequency of the applied pulse stream on input programming wordline 18' can be made to correspond to the magnitude of the applied input or the neuron output (i.e.,Ω).

FIG. 6 illustrates the pattern of applied programming voltages during cycle 3. This time, device 12d is targeted for a weight increase (i.e., erasing). This is accomplished by grounding wordline 17' and by raising column summing line 19' to a high potential of approximately 20 volts. As was the case during cycle 1, application of a high voltage pulse stream to programming wordline 18' causes the floating gate member of device 12d to become erased of charge whenever wordline 18' is grounded. Device 12c, which is in the same row as device 12d, is inhibited from changing its weight by application of the intermediate voltage to summing line 19. Similarly, devices 12a and 12b receive no change to their programming states: device 12a receiving an intermediate voltage along column line 19, and device 12b having its wordline 17 coupled to a high positive potential.

The final learning cycle, cycle 4, is illustrated in FIG. 7. For this cycle, device 12b is programmed, which results in a decreased connection weight in the corresponding synapse cell. As before, the learning devices located in the adjacent column (i.e., devices 12a and 12c) are debiased during this cycle by the application of an intermediate voltage coupled to column summing line 19. Device 12d is likewise inhibited from increasing or decreasing its weight since input programming wordline 17' is grounded. Thus, parallel learning is achieved by the present invention in four cycles. The conditions for implementing parallel learning in four cycles are summarized in Table I below.

TABLE I

|  |  | CY-CLE 1 | CY-CLE 2 | CY-CLE 3 | CY-CLE 4 |
|---|---|---|---|---|---|
| HV INPUT (line 17) | for + INPUT | 0 v | 0 v | 20 v | 20 v |
|  | for − INPUT | 20 | 20 | 0 | 0 |
| Column Voltage | for + Ω | 20 | 0 | 10 | 10 |
|  | for − Ω | 10 | 10 | 20 | 0 |

The net effect after the four cycles, on any synapse in the array, is that if the input to that synapse and Ω (which in this case represents the match condition of the neuron output) are both the same polarity, then the weight of that synapse is incremented; otherwise the weight is decremented. Furthermore the intensity of the weight increase or decrease can be made dependent upon the intensity of the input or the intensity of Ω.

Practitioners in the art will appreciate that not only is the present invention extendable to larger networks, but also to networks that are organized differently. For example, the present invention is ideally suited to networks that employ multiple hidden layers. Another alternative is to make the source/drain voltage across the learning field-effect devices dependent on the strength of the output of the network. For instance, during erasing, the column summing lines may vary in voltage between 18 and 20 volts, depending on the strength of the output, while both input wordlines remain grounded. It is appreciated that each of these alternative embodiments are well within the spirit and scope of the present invention.

WEIGHT UPDATES IN TWO CYCLES

Parallel learning can also be implemented in a neural network in two cycles rather than four. The tradeoff for reducing the number of learning cycles is that more devices are required, however, the basic idea still relies upon recurrent debiasing.

FIG. 8 illustrates a learning circuit which achieves parallel learning in two cycles rather than four. The embodiment of FIG. 8 again includes floating gate devices 31 and 32, sharing a common floating gate member. The control gate of device 31 is coupled to input programming wordline 43, whereas the control gate of device 32 is coupled to input programming wordline 44. These wordlines function in the same manner as wordlines 17 and 18 in the embodiments of FIGS. 1–7. In addition, each of the floating gate devices has associated with it ordinary n-channel field-effect devices 33 and 34, each shown coupled in series between device 31 and one of the associated bit lines (i.e., column summing lines). By way of example, device 34 is coupled between bit line 42 and device 31. Device 33 is coupled between bit line 41 and device 31. Likewise device 32 is coupled in series with n-channel field-effect devices 35 and 36. In the configuration of FIG. 8, devices 33 and 35 each are connected to wordline 46, while devices 34 and 36 are connected to wordline 47. A control voltage signal $V_c$ drives wordlines 46 and 47; wordline 47 being the inverse of 46 by virtue of inverter 49.

The operation of the learning circuit of FIG. 8 is similar to that of the previous embodiments, except that field-effect devices 33-36 function to split bit lines 41 and 42 from floating gate devices 31 and 32. This is done so that different voltages can be applied to programming bit lines 41 and 42, depending on the match condition (i.e., $\Omega$) for the associated column line without the possibility of incurring short circuit currents. FIG. 8 shows one possibility—wherein line 41 is grounded and line 42 is taken to a high positive potential of 20 volts for a match condition. The situation is reversed for a no-match condition.

During the first cycle of operation, the input $V_c$ is at a logical high level. This means that line 46 is low and line 47 is high. In this condition, devices 33 and 35 are off, thereby disconnecting devices 31 and 32 from bit line 41. At the same time, devices 34 and 36 are on, which couple bit line 42 to the floating gate devices. For those columns of the array in which a match is indicated, line 42 is utilized to couple a high voltage to floating gate devices 31 and 32 to selectively increase synaptic weights. Note that the operation of input programming wordlines 43 and 44 is the same as described for earlier embodiments. Of course, the operation of both programming wordlines depends on the polarity of the input. Input signal $V_c$ is independent of input or match ($\Omega$) conditions.

During the second cycle, the input control signal $V_c$ is in the opposite state; that is, $V_c$ is logically low. For this situation, line 46 is high and line 47 low such that devices 33 and 35 are on and devices 34 and 36 are off. This means that line 41 is now coupled to the floating gate devices 31 and 32, and line 42 is effectively disconnected. Again, input programming wordlines 43 and 44 operate as before, with one of the wordlines receiving a high voltage pulse stream, which preferably transitions between 0 and 20 volts.

The overall effect on the neural network after the two weight change cycles is to increase the weight of those synapses whose input and $\Omega$ have the same polarity, while decreasing the weight of those with different polarities. The function of control signal $V_c$ is to separate in time the erasing events from the programming events. Note that in certain applications the programming/erasing events may require different conditions and can thus be better controlled when performed in two separate cycles.

Analogous to FIG. 2, the circuit of FIG. 8 can be simplified to that of FIG. 9 without loss of function. In FIG. 9, floating gate devices 31 and 32 (see FIG. 8) have been merged into dual control gate device 50. One of the control gates is coupled to line 43 and the other is coupled to line 44. The floating gate member of device 50 is connected to the computation section of the synapse cell, which may be distinct from the learning section. Additionally, in the case of FIG. 9, field-effect devices 33 and 35 can be merged into a single MOS device 51, while devices 34 and 36 are consolidated into MOS device 52. Thus, the embodiment of FIG. 9 offers the advantage of a reduced device count.

WEIGHT UPDATES IN A SINGLE CYCLE

The number of learning cycles can be further reduced to a single cycle by allowing the increase and/or decrease of the synaptic weights to occur simultaneously. FIG. 10 shows the learning section of a synapse cell that operates in this manner to provide weight updates in a single learning cycle. The cell of FIG. 10 includes ordinary n-channel field-effect devices 56 and 57 coupled in series between column lines 41 and 42. The control gate of device 57 is coupled to input control line 47, whereas the control gate of device 56 is coupled to input control line 46. Inverters 48 and 49 function to generate a control signal $V_C$ on line 47, while line 46 carries the inverse logic signal ($\overline{V}_C$).

Devices 56 and 57, as well as column lines 41 and 42, function in a similar manner to that of the equivalent elements described above in connection with FIGS. 8 and 9. That is to say, when $V_C$ is at a logical low level, line 46 is high and transistor 56 is turned on to couple column line 41 to the source/drain of floating gate device 58. Floating gate device 58 has its control gate coupled to high voltage pulse input line 59, and it floating gate is coupled to the computation section of the associated synapse cell. Of course, in many implementations, the computation and learning sections can be merged into a single cell structure.

With $V_C$ at a logical high level, line 46 is low and line 47 is high. This turns off device 56 thereby disconnecting line 41 from transistor 58, and turns on device 57 to couple column line 42 to the source/drain node of floating gate device 58. Note that device 58 has a single control gate member and is shown with merged source and drain nodes. It should be understood, of course, that the source and drain nodes can remain as two distinct nodes without loss of function.

In the circuit of FIG. 10, the control signal $V_C$ carries information about the polarity of the input signal. In other words, whenever the input is positive, $V_C$ is logically high, otherwise it is at a logical low level. An example of the various combinations which can be produced by the control signal $V_C$, when combined with the condition of column lines 41 and 42, is shown in the table included within FIG. 10. During weight adjustments lines 41 and 42 are driven to voltage levels proportional to $+\Omega$ and $-\Omega$, respectively. For instance, a low potential (e.g., 0 volts) is coupled to the source/drain node of floating gate device 58 whenever the signs of the input signal and $\Omega$ are matched. The opposite condition results whenever they are mismatched; that is, the source/drain node is driven to a high potential (e.g., 20 volts).

Whenever the source/drain node of device 58 is high, a high voltage pulsing signal coupled to the control gate of device 58 produces large electric fields during the time that the pulse is in its low voltage state. Note that this electric field is in a direction which acts to remove charge (i.e., erase) from the floating gate of device 58. At other times, the electric field collapses and no modification of the floating charge occurs.

Conversely, whenever the source/drain node of floating gate device 58 is at a low potential, the high voltage pulsing signal on the control gate of device 58 produces an electric field during the time that the pulse is in its high state. Note that this generates an electric field of reverse polarity—causing charge to be transferred onto the floating gate of device 58 (i.e., programmed). The overall effect on the synaptic gate for each of the various possible conditions is summarized in the table included within FIG. 10.

Note that within a neural network implemented with synapse cells having learning sections such as that shown in FIG. 10, the programming and erasing events within the array occur simultaneously within a single learning cycle. Programming and erasing events, however, are still separated in time by the phase of the pulsing signal applied to line 59. This allows independent control of the erasing and programming phenomena by manipulation of the duty cycle of the pulsing signal.

As before, the frequency—or number of pulses of the pulsing signal applied to line 59—can be made proportional to either the magnitude of the input applied to the network or to the magnitude of $\Omega$. Still another possibility is to make the frequency independent of either the input or $\Omega$ magnitudes, while only using the respective sign information for the polarity of lines 41, 42, 46 and 47. Thus, in a single cycle implementation of FIG. 10, the concept of dynamic debiasing is being performed at the rate of the pulsing signal on line 59.

The concept of dynamic debiasing can also be extended to non-floating gate technologies. An example of the learning section of a synapse cell which performs a function similar to that of the circuit of FIG. 10—but which does employ floating gate devices—is shown in FIG. 11. The circuit of FIG. 11 once again includes n-channel field-effect devices 56 and 57 coupled in series between column lines 41 and 42. Each of these respective field-effect devices has its gate coupled to input control lines 46 and 47. Consistent with the previous embodiments, control lines 46 and 47 carry information about the polarity of the input signal.

Instead of a single floating gate device, however, the circuit of FIG. 11 includes a pair of n-channel field-effect devices coupled in parallel between nodes 66 and 68. Node 68 is commonly coupled to devices 56 and 57, whereas node 66 is coupled to capacitor 65 and also to the computation section of the associated synapse cell. Practitioners will appreciate that charge storage node 66 represents the equivalent floating gate node described in previous embodiments. Also shown is device 61 which has its gate coupled to node 66. Similarly, device 62 has its gate coupled to node 68.

In the circuit of FIG. 11, low voltage pulses are applied to line 57 rather than the high voltage pulses of earlier embodiments. The low voltage pulses appearing on line 67 are coupled to node 66 through capacitor 65. Capacitor 65 may comprise any one of a number of standard semiconductor capcitors.

The parallel configuration of devices 61 and 62 provides conduction into or out of node 66 during the time that the magnitude of the pulsing signal on line 67 exceeds the turn-on threshold voltage of these devices. In these conditions, field-effect device 61 functions to discharge the equivalent storage node 66. Device 62, on the other hand, functions to charge node 66.

Because the turn-on voltage thresholds of devices 61 and 62 are usually much smaller than the high voltages required for Fowler-Nordheim tunneling in standard floating gate technologies, the magnitude of the pulses present on line 67 can be significantly lower than in previous embodiments. For example, voltage pulses transitioning between 0 V and 5 V should be more than adequate for most applications. (Obviously, some of the charge stored on node 66 is eventually lost due to junction leakage. Therefore, the circuit of FIG. 11 may require refreshing.)

It is worth noting that low voltage operation can also be achieved in the circuit of FIG. 10 by exposing device 58 to ultraviolet radiation. It is well known that exposure of floating gate devices to ultraviolet radiation effectively makes the dielectric between the floating gate and the source/drain node more conductive, thereby facilitating the transfer of charge to/form the floating gate itself.

Another possibility for the circuit of FIG. 10 is to reverse the connection of floating gate device 58 such that the source/drain node is driven by the pulsing signal on line 59 and the control gate is connected to the intermediate node between devices 56 and 57. In this configuration, the functionality of the cell is basically the same as described above. Additionally, if the pulsing signal—instead of being a square wave signal—is replaced by a periodic signal composed of positive-going and negative-going pulses having narrow widths (e.g., relative to the repetition) that are separated by an intermediate "zero" voltage, the functionality is similarly unaffected. In other words, the rate at which weight changes occur and their polarity may be altered without interfering with the basic functionality of the device.

Although the present invention has been described in conjunction with certain embodiments, it is appreciated that the invention may be implemented in a variety of other ways. Consequently, it is to be understood that the particular embodiments shown and described by way of illustration are in no way intended to be considered limiting. Reference to the details of these embodiments is not intended to limit the scope of the claims which themselves recite only those features regarded as essential to the invention.

What is claimed is:

1. A neural network including an array of cells for computing the product of an input signal and a connection weight to generate a neural output signal, each of said cells comprising an associated circuit for implementing weight updates in a single learning cycle wherein said circuit comprises a charge storage means for storing an electrical charge representing said connection weight, and a logic means for coupling said neural output signal to said charge storage means, said network further comprising a means for generating a voltage pulse stream coupled to said charge storage means, said voltage pulse stream having a magnitude capable of producing an electric field sufficient to effectuate charge transfer to/from said charge storage means.

2. The network of claim 1 wherein said neural output is provided along pairs of column lines, each of said pairs being coupled to a column of said cells within said array.

3. The network of claim 2 wherein said logic means comprises an intermediate node coupled to said charge storage means, a first field-effect device coupled between said intermediate node and a first column line, and a second field-effect device coupled between said intermediate node and a second column line, said first and second column lines comprising one of said pair of column lines within said network;

said logic means further comprising a means for providing a control signal and its inverse to the gates of said first and second field-effect devices, respectively, such that when said control signal is in a first logic state said charge storage means is coupled to said first column line, and when said control signal is in a second logic state said charge storage means is coupled to said second column line.

4. The network of claim 3 wherein said charge storage means comprises a floating gate device having a floating gate member for storage of said charge.

5. The network of claim 4 wherein said floating gate device includes a control gate coupled to receive said voltage pulse stream and a source/drain region coupled to said intermediate node.

6. The network of claim 5 wherein the frequency of said voltage pulse stream is proportional to the magnitude of said input signal.

7. The network of claim 5 wherein the frequency of said voltage pulse stream is proportional to the magnitude of said neural output.

8. The network of either claim 6 or 7 wherein said control signal represents the polarity of said input signal.

9. The network of claim 3 wherein said charged storage means comprises:
a charge storage node;
third and fourth field-effect devices coupled in parallel between said intermediate node and said charge storage node, said third field-effect device having its gate coupled to said intermediate node and said fourth field-effect device having its gate coupled to said charge storage node; and
a capacitor means for coupling said voltage pulse stream to said charge storage node.

10. The network of claim 9 wherein the frequency of said voltage pulse stream is proportional to the magnitude of said input signal.

11. The network of claim 9 wherein the frequency of said voltage pulse stream is proportional to the magnitude of said neural output.

12. The network of either claim 10 or 11 wherein said control signal represents the polarity of said input signal.

* * * * *

UNITED STATES PATENT AND TRADEMARK OFFICE
CERTIFICATE OF CORRECTION

PATENT NO. : 5,247,206
DATED      : September 21, 1993
INVENTOR(S) : Hernan A. Castro It is certified that error appears in the above-indentified patent and that said Letters Patent is hereby corrected as shown below:

Column 5, line 22, Delete "line" Insert in place thereof --lines--

Signed and Sealed this

Nineteenth Day of September, 1995

Attest:

BRUCE LEHMAN

Attesting Officer        Commissioner of Patents and Trademarks